No. 738,072. PATENTED SEPT. 1, 1903.
M. SCHELL.
FOCUSING DEVICE FOR CAMERAS.
APPLICATION FILED JULY 15, 1902.
NO MODEL.

Witnesses
Edwin G. McKee
B. L. Funk

Inventor
Martin Schell
By Victor J. Evans
Attorney

THE NORRIS PETERS CO., PHOTO-LITHO., WASHINGTON, D. C.

No. 738,072.

Patented September 1, 1903.

UNITED STATES PATENT OFFICE.

MARTIN SCHELL, OF ROCHESTER, NEW YORK.

FOCUSING DEVICE FOR CAMERAS.

SPECIFICATION forming part of Letters Patent No. 738,072, dated September 1, 1903.

Application filed July 15, 1902. Serial No. 115,729. (No model.)

*To all whom it may concern:*

Be it known that I, MARTIN SCHELL, a citizen of the United States, residing at Rochester, in the county of Monroe and State of New York, have invented new and useful Improvements in Focusing Devices for Cameras, of which the following is a specification.

This invention relates to camera-focusing devices of the type in which the lens of the finder attachment of a camera is adjustable with the camera-lens in order to obtain the focus upon the glass of the finder and obviate the necessity of employing the usual focusing glass or screen in the rear of the camera.

The object of the invention is to provide a focusing device of this character having a simple and durable construction and adapted to be conveniently and expeditiously operated.

With above ends in view the invention consists in the novel construction and arrangement of parts, all as hereinafter fully described in connection with the accompanying drawings, and pointed out specifically in the appended claim.

Figure 1:
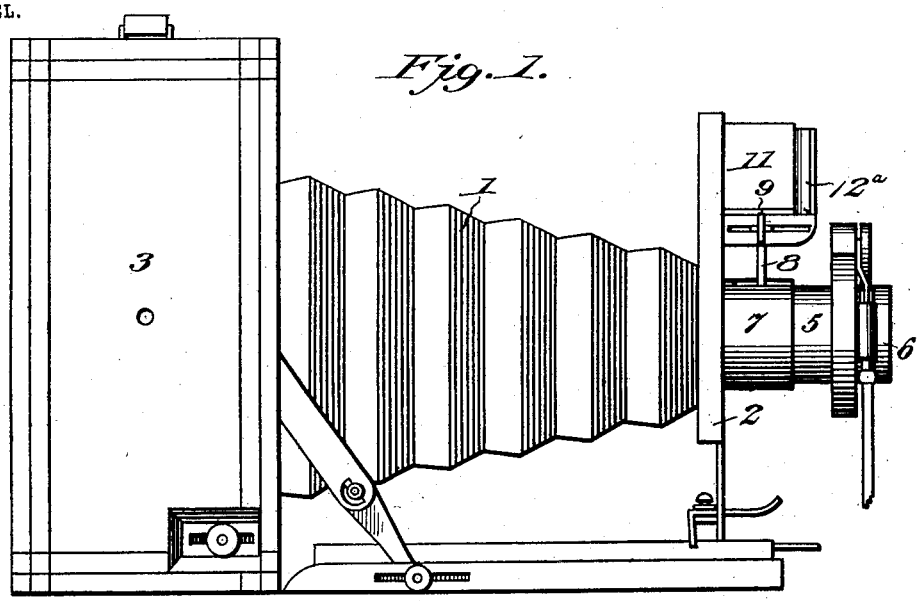
Figure 2:
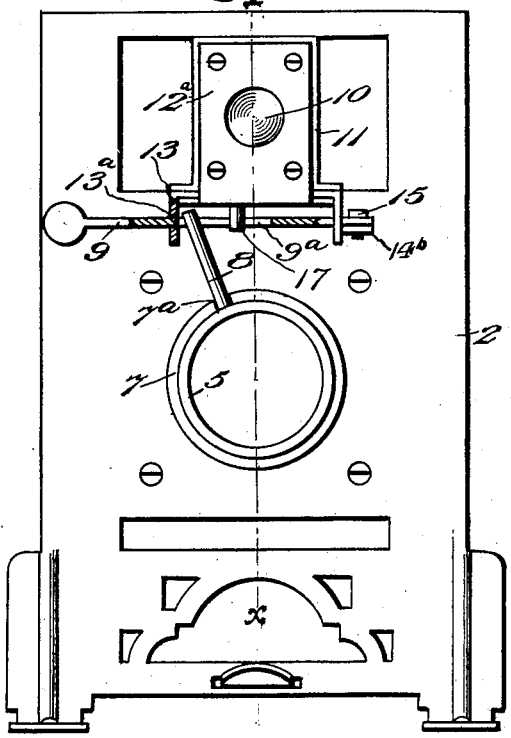
Figure 3:
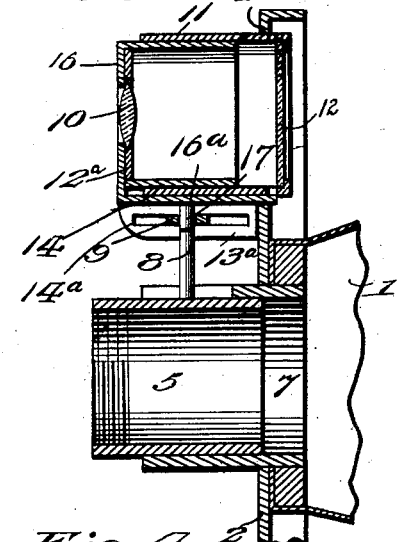
Figure 4:
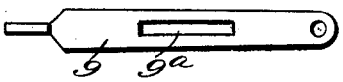

In the drawings, Figure 1 is a side view of a camera in which the invention is shown applied; Fig. 2, a front elevation of the camera-front; Fig. 3, a vertical sectional view taken on the line $x\,x$ of Fig. 2, and Fig. 4 a detail view of the focusing-lever.

The invention is illustrated as applied to that type of camera in which the bellows 1 and camera-front 2 are contained when collapsed within the case 3, the front 4 of the case forming the camera-bed. In the present instance the camera shown is that forming the subject-matter of a separate application filed by me and bearing Serial No. 115,730.

The front 2 is provided with the lens-tube 5, carrying shutter mechanism 6, which tube for the purposes of focusing is mounted within an outer tube 7 after the usual manner. This outer tube is formed with the slot $7^a$, preferably at its upper side and slightly one side the center thereof, which slot receives and forms a guide for an arm 8, made rigid with the lens-tube and projecting upwardly therefrom at a slight inclination, so as to bring its end into proper operative relation with the lever 9, by which and through its engagement with said arm 8 the lens-tube is adjusted in common with the lens 10 of the finder and the requisite proportional movement of the two lenses secured, as will more fully appear hereinafter. The finder is shown as an open-ended rectangular box 11, provided at one end with a telescoping light-excluding section carrying the lens 10, and at its rear provided with a screen or ground glass 12, bearing the same proportional relation to its lens in respect to size, shape, and focusing distance as that borne by the photographic plates to its lens, so that the image on the finder-glass 12 will be a smaller but an exact reproduction of that appearing upon the photographic plate. The finder is mounted on the front 2, adjacent the top thereof, and so as to project over the lens-tube and to exhibit the ground glass 12 at a point where the operator can always command a view thereof at all times without inconvenience and while performing other operations required in manipulating the camera. For the purpose of this mounting the front 2 is formed with an opening $2^a$, into which the finder slightly extends. Preferably this front is struck up from a metal sheet, and a support 14 for the finder is formed by bending down at right angles the portion of the sheet partially cut from the front to form the opening. Adjacent its sides this support 14 is bent longitudinally to form depending supports for the mounting of the operating-lever 9 and for this purpose are each formed with a horizontal slot $14^a$, through which the lever extends and in which it has movement. A lug $14^b$, to which one end of the lever is pivoted, as at 15, is formed on one of the depending supports by upturning a portion thereof.

The lens-section 12 is provided with an outer removable facing-plate 16, between which and the end side of this section the lens 10 is held. This plate is formed with a right-angle extension $16^a$, which extends under the support 14 and in contact therewith and carries a projection 17, by which engagement is made with the lever 9 and a sliding movement imparted to the lens-section $12^a$ as the result of the lever movement. This lever is provided with a slot $9^a$, into which projects the arm or projection 8 of the camera lens-tube and the projection 17 of the lens-section of the finder, which as said lever is swung back and forth will impart a back-and-forth simultaneous movement to the lens-tube of the camera and the lens-section of the finder; but by virtue of the engagement of said lever with these projections, as shown, that of the camera lens-tube being farther from the pivot 15 thereof, the greater movement will be imparted to the lens-tube than to the lens-section of the finder, and thus these elements are so connected to a common lever as to preserve the relative distance of movement of each, though accomplished simultaneously.

What I claim is—

In a focusing device, the combination with a camera-front having a forwardly-extending support and integral, depending slotted supports at the sides thereof; of a longitudinally-slotted lever pivoted to one, and slidably mounted in the slots in both, depending supports, a finder secured upon the forwardly-extending support, a lens-tube slidably mounted in one end thereof, an angular extension to the tube projecting under the forwardly-extending support, a projection upon said extension, a slotted tube extending from the camera-front, a lens-tube slidably mounted therein, and a projection upon said tube and extending through the slotted tube, the projections of the two lens-tubes being arranged within the slot in the lever and adapted to be moved simultaneously thereby.

In testimony whereof I affix my signature in presence of two witnesses.

MARTIN SCHELL.

Witnesses:
JOSEPH BODAM,
JOSEPH MÜLLER.